Feb. 28, 1928.
G. FROST
1,660,748
CULINARY UTENSIL
Filed June 2, 1926
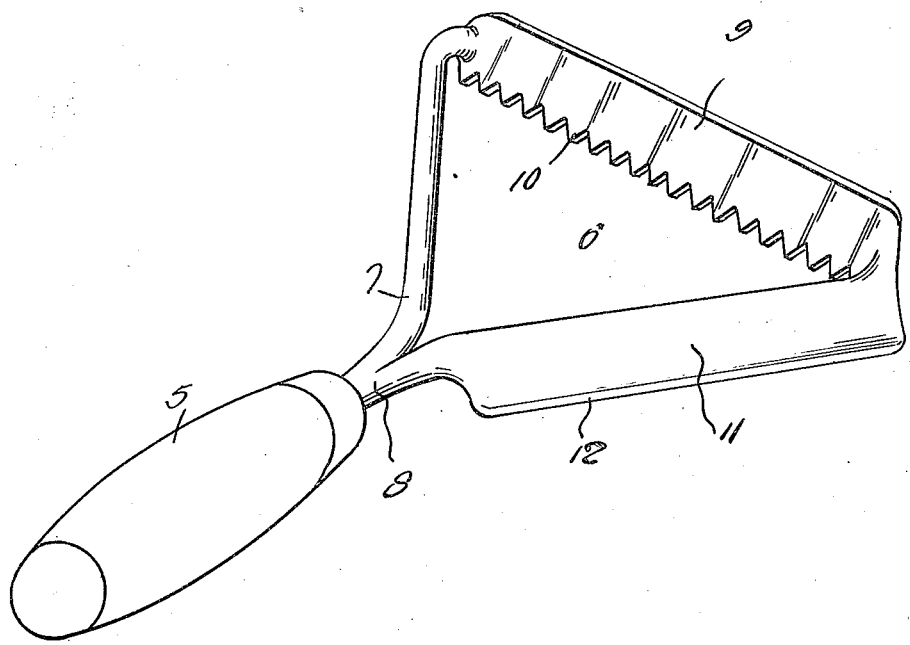
Inventor
G. Frost,
By Clarence A. O'Brien
Attorney Patented Feb. 28, 1928.

1,660,748

UNITED STATES PATENT OFFICE.

GEORGE FROST, OF CHARLESTON, SOUTH CAROLINA.

CULINARY UTENSIL.

Application filed June 2, 1926. Serial No. 113,228.

This invention relates to culinary utensils and has for its primary object to provide a tool of this character that is primarily adapted for use in the scaling and cleaning of fish, and that is also adapted for permitting the quick severance of the head and tail from the fish prior to or after the scaling and cleaning of the fish.

An additional object of the invention is to provide a utensil of this character that is extremely simple of construction, but yet one that is adapted highly for the purposes intended, and that permits of several operations to be performed by the use of the single tool.

Other objects will become apparent as the nature of the invention is better understood, the same comprising the novel form of the utensil hereinafter more fully described, shown in the accompanying drawing and claimed.

In the drawing—

The figure is a perspective of a utensil constructed in accordance with the present invention.

Now having particular reference to the drawing, 5 represents a handle which is preferably constructed of wood but which may be made of any suitable or desired material. Rigidly arranged within the forward end of said handle 5 in any desirable manner is the head of the utensil generally designated 6, said head being constructed of a triangular shaped metallic bar, the ends of which are brought together as at 7 after which they are extended outwardly in parallel relation and then welded, soldered or otherwise secured for providing a shank 8 for engagement within the forward end of the handle 5, and be therein secured in any desirable manner as previously mentioned.

The front side of the bar forming said triangular shaped head is flattened for providing a blade 9, the bottom edge of which is formed with serrations or teeth 10 to permit of the rapid fish scaling operation. As disclosed, the transverse axis of the blade 9 is at substantially right angle with respect to the horizontal plane of the utensil to permit the serrations or teeth to be brought into ready engagement with the body of the fish.

One side of the triangular bar forming the head is also flattened for providing a further blade 11, the outer edge is sharpened to provide a cleaver edge 12. This blade is so formed as to have its cutting edge extend outwardly from the head 6 in order that the weight of the head will be upon the blade when the same is swung downwardly by the operator in severing the head or tail of the fish body. It is of course also to be understood that said blade may be employed for slitting the fish body in order to permit of the removal of the entrails thereof.

It will thus be seen that I have provided a highly novel, simple and efficient form of utensil that is so constructed as to permit the use of the same for several operations in the preparation of fish.

Having thus described the invention, what I claim as new and desire to secure by Letters Patent is:—

1. In a fish scaling implement of the class described, a handle, a head comprising a solid round bar bent into substantially triangular formation, a shank extending from the apex of the triangular head and secured in said handle, the side of the triangular shaped head remote from the handle being flattened, and disposed at right angles to the other sides of the heads and the handle, and serrations formed in the lower end of the flattened side.

2. In a cleaver of the class described, a handle, a substantially triangular shaped head formed from an elongated solid round bar, a shank extending from the apex of the triangular shaped head and secured within the handle, one of the sides of the triangular shaped head adjacent the handle being flattened and disposed in the same horizontal plane as the head and the handle, the outer edge of the flattened side being sharpened to provide a cleaver cutting edge.

3. As an article of manufacture, a head comprising an elongated solid round bar, the end portions thereof being bent and disposed rearwardly in converging relation, the extremities being disposed in abutting relation and secured together to form a handle attaching shank, the intermediate portion of the bar being flattened and disposed at right angles to the converging end portions of the bar to provide a blade, one of the rearwardly bent end portions being flattened and disposed in the same horizontal plane as the other rearwardly bent end portion of the bar to provide a blade.

In testimony whereof I affix my signature.

GEORGE FROST.